Jan. 10, 1950 N. A. TALMAGE 2,494,417
ROTATABLE DISKS FOR SEPARATING POTATOES FROM DEBRIS
Filed April 21, 1947 2 Sheets-Sheet 1

Inventor
Nathaniel A. Talmage

By *Clarence A. O'Brien and Harvey B. Jacobson*
Attorneys

Jan. 10, 1950     N. A. TALMAGE     2,494,417
ROTATABLE DISKS FOR SEPARATING POTATOES FROM DEBRIS

Filed April 21, 1947     2 Sheets-Sheet 2

Inventor
Nathaniel A. Talmage

By *Clarence A. O'Brien*
*and Harvey B. Jacobson*
Attorneys

Patented Jan. 10, 1950

2,494,417

UNITED STATES PATENT OFFICE 2,494,417

ROTATABLE DISKS FOR SEPARATING POTATOES FROM DEBRIS

Nathaniel A. Talmage, Riverhead, N. Y.

Application April 21, 1947, Serial No. 742,788

2 Claims. (Cl. 209—112)

This invention appertains to novel and useful improvements in potato harvesting machines, particularly designed for use in connection with potato diggers.

An object of this invention is to provide means for rotating vegetables, particularly potatoes, in order to separate the said vegetables from refuse.

Another object of the present invention is to provide baffle means for sweeping refuse such as dirt, stones, straw and the like from vegetables prior to packing the same.

Another object of this invention is to provide an improved potato harvesting device, rendered improved by the utility of improved means for separating refuse from the vegetables.

A further object of the present invention is to provide an extremely simple device of the character described which is extremely efficient in operation and which makes it possible to save time and labor in certain agricultural operations.

Ancillary objects and features of novelty shall become apparent to those skilled in the art, in following the description of the preferred embodiment of the present invention, illustrated in the accompanying drawings wherein.

Referring now in detail to the illustrated preferred embodiment of the present invention, like reference characters are used throughout to indicate similar elements thereof.

Figure 1:
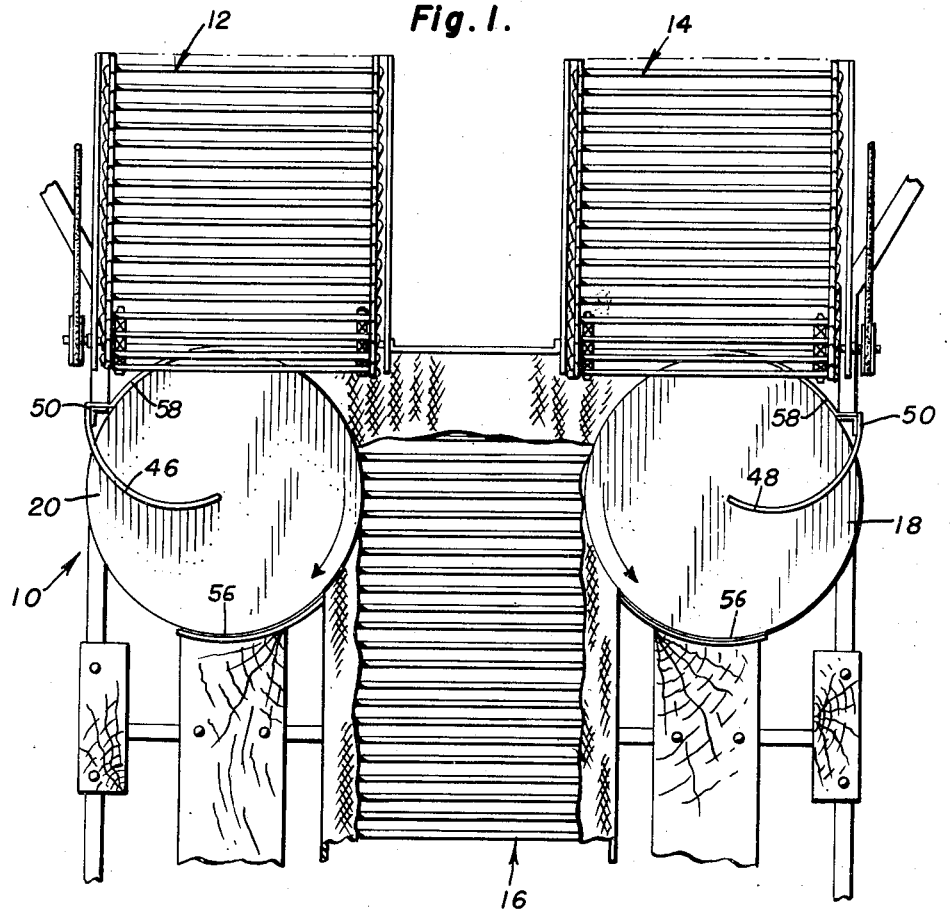
Figure 1 is a plan view of a portion of a potato digger having the invention operatively secured thereto.

This invention has been developed to provide a device for further sifting and separating refuse from vegetables, particularly potatoes, in the usual digging and harvesting process.

A potato digger generally indicated by the reference numeral 10, is provided with the usual power driven digging conveyor elements 12 and 14 respectively and the endless conveyor sacking means 16. In operation, potatoes are dug and conveyed by the elements 12 and 14 respectively and led to the portion of the agricultural instruments which forms the basic portion of the invention. Rotary plates 18 and 20 respectively are provided for the purpose of receiving both potatoes and refuse from the said digging elements 12 and 14. Each of these rotary means are identical and consequently a description of one will necessarily lead to an understanding of the other identical element. A chain driven shaft 22 is utilized to drive the endless conveyor 16, being suitably journaled in bearings 24 which are secured to brackets 26.

One means for rotatably driving the said disks 18 and 20 is to provide bevel gears in a transmission adapted to be driven by the shaft 22. Of course, any suitable driving means may be provided in lieu of the bevel gears such as an additional chain drive, belt and pulley arrangement or other practical equivalents.

Figure 4:
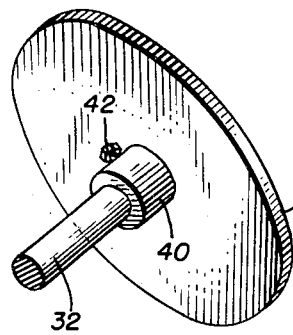
Figure 4 is a perspective view of the rotary disk means forming part of the present invention.

In the illustrated driving means, a bevel gear 28 is rigidly secured to the said shaft 22 and engages a second, larger bevel gear 30. This last mentioned bevel gear 30 is secured to a stub shaft 32 journaled in a suitable bearing and bracket therefor 34. This last mentioned bearing and bracket may be secured to any suitable, convenient tie member of the farm implement 10. A link 36 may be suitably secured as by welding, brazing, or the like to selected reinforcing members of the said farm implement 10 and a clamp 38 applied thereto. Suitable bearings 39 may be received in the said clamp 38 for the purpose of journaling the said shaft 32 therein. The disk 20 may then be removably secured to the terminal portion of the said shaft 32 for rotation thereof. The preferable means for removably securing said disk to said shaft is illustrated in Figure 4 particularly. It will be seen that a collar 40 is secured to or if desired, integral with the disk 20 and an aperture is provided therein. A set screw 42 is provided in the said aperture for engagement wtih the shaft 32 thereby holding the disk 20 and shaft 32 immovable relative to one another.

Figure 2:
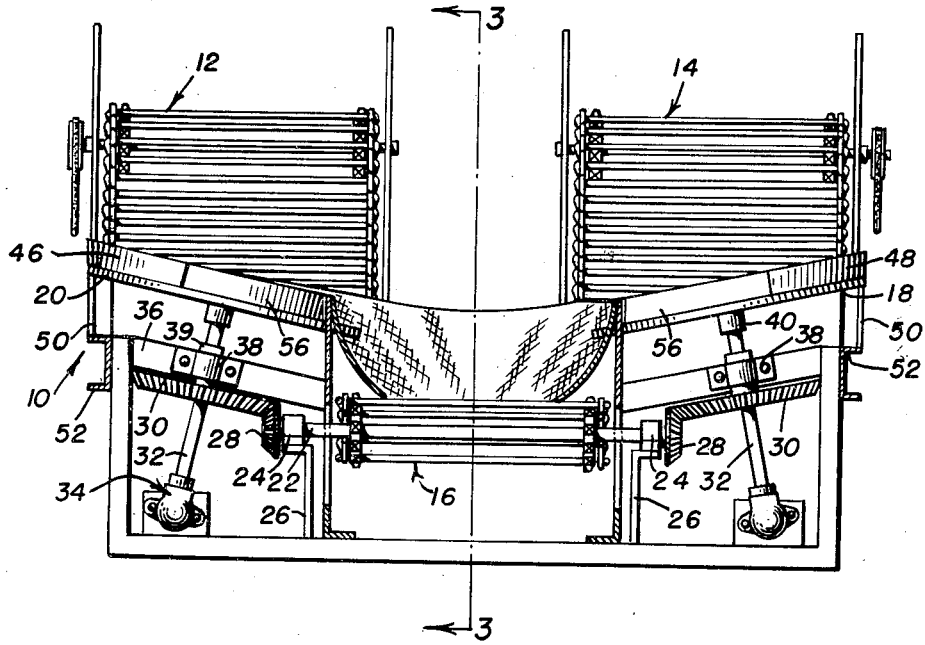
Figure 2 is a rear elevational view of the preferred embodiment of the present invention.
Figure 3:
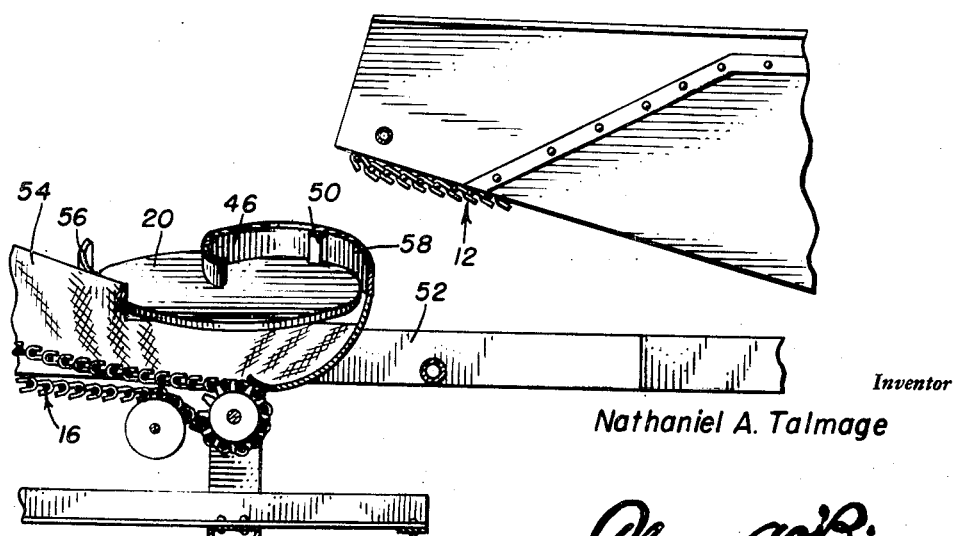
Figure 3 is a longitudinal sectional view of the invention disclosed in Figure 2 and taken substantially on the line 3—3 thereof and in the direction of the arrows.

Inspection of Figures 3 and 2 clearly disclose the angularity of the disk means 18 and 20. It will be seen that after vegetables and refuse are received on the said disks from the digging and conveying elements 12 and 14 respectively, the inclination of the disks coupled by the roundness of the said vegetables (potatoes) rolls the same on the sacking conveyor 16. Baffle means are provided on the said disks 18 and 20 for the purpose of sweeping residual refuse from the invention (disks 18 and 20) during the operation thereof. It will be noted that the said baffle means is composed of a simple arcuate arm 46 and 48 respectively, juxtaposed and adjacent the upper surface of the said disks 18 and 20. Further, it is seen that the said baffle means extends only partially across the said disks, which feature is necessary to direct the potatoes to the sacking 16 and the refuse off to the side and to the ground. A rod 50 extends from said baffle means 46 and 48 respectively for the purpose of securing the baffle means in the desired location relative to the plane top surface of the disk means. This arm 50 may be fixedly secured to any convenient elements of the farm implement 10, preferably a suitable channel member 52. Inspection of Figure 3 discloses the guide means 54 provided along the marginal edges of the said endless conveyor 16. In utilizing the present invention, a portion of this guide means 54 is cut away and bent to form a second baffle 56 for the purpose of guiding refuse to a convenient and out of the way discharging position. Of course, if it is desired the said baffle 56 may be welded or otherwise secured to the guide means 54 instead of following the bending operation.

Referring now again to Figures 1 and 3, there is seen a third baffle 58 forming a continuation of the above described baffle means 46 and 48 respectively. This baffle means 58 serves the purpose of restricting the undesired travel of potatoes (from losing the same).

There has been described and illustrated but a single preferred embodiment of the present invention, capable of performing all of the specifically mentioned objects as well as many ancillary objects of the present invention. It is apparent that much facility is afforded in the cleaning and sifting of potatoes prior to packing the same in the field or farm land. The necessity of laborers having to pick out and remove large stones, straw, fragments of clay and the like, is materially reduced. This is both an expense, time and labor saving provision.

It is apparent to those skilled in the art, that various changes including omissions and additions may be made herein without departing from the spirit of the invention. Accordingly, limitation is sought only in accordance with the scope of the following claims.

Having thus described the present invention what is claimed as novel and improved is as follows:

1. Means for separating debris from potatoes comprising: an implement frame having a pair of inclined endless sifting conveyors substantially parallel and spaced from each other; a pair of rotatable disks disposed at the upper ends of said conveyors, a portion of each disk underlying said conveyors, said disks being angularly inclined with relation to a horizontal plane and having the lowermost portions thereof at the side adjacent the space between said sifting conveyors; a potato receiving conveyor disposed between the sifting conveyors and extending beneath the disks; a vertical supporting rod at the upper side of each disk, a first baffle means attached to and extending from the rod circumferentially of the disk and under the sifting conveyor, and a second baffle means having an arcuate form and lying above the disk and in close proximity thereof and extending from the rod towards the center of the disk.

2. The combination of claim 1 and a third baffle means for each disk extending from the receiving conveyor circumferentially of the disk substantially diagonally opposite the first baffle means.

NATHANIEL A. TALMAGE.

REFERENCES CITED

The following references are of record in the file of this patent:

UNITED STATES PATENTS

| Number | Name | Date |
| --- | --- | --- |
| 944,904 | Owens | Dec. 28, 1909 |
| 1,005,304 | Potter | Oct. 10, 1911 |
| 1,030,042 | Wilmot et al. | June 18, 1912 |
| 1,058,259 | Pratt | Apr. 8, 1913 |
| 1,267,692 | Prinz | May 28, 1918 |
| 1,291,278 | Ulrich | Jan. 14, 1919 |
| 1,454,175 | Kovar et al. | May 8, 1923 |
| 2,068,146 | Medcalf | Jan. 19, 1937 |
| 2,294,252 | Supalla | Aug. 25, 1942 |

FOREIGN PATENTS

| Number | Country | Date |
| --- | --- | --- |
| 365,384 | Great Britain | Jan. 21, 1932 |